United States Patent [19]

Beadle

[11] Patent Number: 4,569,531
[45] Date of Patent: Feb. 11, 1986

[54] HYDRAULIC TRAILER

[76] Inventor: George D. Beadle, 2734 Casa Del Norte Ct., NE., Albuquerque, N. Mex. 87112

[21] Appl. No.: 521,298

[22] Filed: Aug. 8, 1983

[51] Int. Cl.[4] ............................................. B62D 63/06
[52] U.S. Cl. .................................. 280/30; 280/80 B; 280/415 B; 414/475
[58] Field of Search ................ 280/30, 415 B, 80 B, 280/766.1; 180/24.02, 41; 296/182; 414/474, 475, 476; 175/207

[56] References Cited

U.S. PATENT DOCUMENTS

| 2,751,234 | 6/1956 | Couse | 280/30 |
| 3,314,689 | 4/1967 | Hogan | 280/415 B |
| 4,204,697 | 5/1980 | Santerre | 180/24.02 |

FOREIGN PATENT DOCUMENTS

| 756947 | 4/1967 | Canada | 280/80 B |
| 2338372 | 2/1975 | Fed. Rep. of Germany | 280/766.1 |
| 1486894 | 10/1977 | United Kingdom | 414/475 |
| 511905 | 7/1976 | U.S.S.R. | 414/475 |

Primary Examiner—Joseph F. Peters, Jr.
Assistant Examiner—Joseph G. McCarthy
Attorney, Agent, or Firm—Robert W. Harris

[57] ABSTRACT

A hydraulically operated trailer for transporting heavy equipment to a remote operational site, and for lowering the trailer platform and equipment to ground level for operation. A plurality of hydraulic jack assemblies raise or lower the trailer platform. The trailer has a hydraulically operated rear truck dolly which is moved within a track-lined guideway by a push-pull hydraulic ram, so as to be readily moved from under the trailer platform for lowering of the platform. The truck dolly remains pivotally attached to the trailer platform when the same is lowered to ground level.

7 Claims, 10 Drawing Figures

HYDRAULIC TRAILER

BACKGROUND OF THE INVENTION

The invention pertains to trailer platforms used to transport heavy equipment to remote operational sites, capable of being lowered to ground level for operation of the equipment.

There are numerous applications, in various industries, in which it is necessary to transport very heavy equipment by road to remote operational sites. In the oil industry, for example, it is often necessary to transport large drilling mud tanks, and associated pump equipment, to remote drilling sites. Such equipment typically has a weight of the order of 20,000 lbs., or more, with the tank empty.

It is important that during transport of such equipment the transporting vehicle provide ample over-the-road clearance. This is particularly true in oil field operations, since the last portion of the journey must often be made over very rough, uneven terrain.

Once the equipment has arrived at the operational site, it is often necessary or at least desirable that the equipment can be operated at ground level. Operating characteristics of the equipment may require operation at ground level. For example, a large oil industry drilling mud tank may be too heavy when full to be supported above ground on a trailer platform. The most convenient general approach to this problem is through use of a trailer platform bearing the equipment, which platform is capable of being lowered to ground level at the operational site.

Where very heavy equipment is involved, as in the abovedescribed oil industry application, it is obviously essential that the means used to lower the trailer to ground level afford great stability during the lowering process, to minimize the risk that the entire rig may capsize, with possibly very damaging consequences for equipment and personnel.

The patent of Couse (U.S. Pat. No. 2,751,234) discloses a truck trailer having hydraulic jacks capable of lowering the trailer to ground level. FIGS. 1-4, ref. Nos. 15-21; Col 1, lines 41-49. The trailer is equipped with a removable truck dolly, which, when attached to the trailer, is attached in a fixed position. FIGS. 1-3, ref. No. 5; Col 1, lines 28-29, 47; Col 2, line 72—Col 3, line 3; FIGS. 8, 9, 11-18; Col 2, lines 28-30; Col 3, lines 17-70.

The patent of Gostomski (U.S. Pat. No. 3,567,271) discloses a camper unit having hydraulic cylinders capable of lowering the camper to ground level. Col 1, lines 12-18, 48-50; Col 2, lines 46-55; Col 5, lines 18-31; FIG. 1, ref. Nos. 36, 42.

The patent of Hulse (U.S. Pat. No. 4,273,347) discloses a truck trailer having a removable truck dolly having parallel rails which slide with tracks on the bottom of the trailer. FIG. 2, ref. Nos. 10, 12, 16, 18; Col 1, lines 10-12, 60-61; Col 2, lines 53-55. The dolly may be secured to the trailer at any of several fixed positions by the use of a pin passing through corresponding openings in one of the rails and one of the tracks. Col 1, line 61-63; FIG. 4, ref. Nos. 16, 18, 24. The patent indicates that such slidable dollies locked with pins had previously been known in the art. Col 1, lines 10-19.

The patent of Wisdom (U.S. Pat. No. 3,894,747) discloses a method and apparatus which may be used to lower a trailer bed to ground level. Col 1, lines 5-10. This is accomplished by a hydraulic lift mechanism of quite different form from that of the present invention. Col 2, line 38—Col 3, line 43; FIGS. 2, 5, ref. No. 26. The patent discloses that hydraulic cylinders have been mounted around the perimeters of trailer beds to "raise or lower the bed as necessary to remove the wheel assembly and subsequently place the trailer bed on the ground." Col 1, lines 21-26.

The patent of James (U.S. Pat. No. 3,419,169) discloses a hydraulically powered folding gooseneck trailer, with a hydraulic cylinder at the juncture of the trailer bed and trailer hitch platform, usable either to raise the hitch platform relative to the trailer bed, or to raise both the hitch platform and trailer bed together. Col 4, lines 27-50; FIGS. 1, 4, ref. No. 30.

The patent of Richey (U.S. Pat. No. 3,497,232) discloses a drop bed trailer of quite different form from that of the present invention, which does not involve a hydraulic system.

The patent of Selby (U.S. Pat. No. 3,734,529) discloses a trailer frame designed for elongated loads, such as mobile homes, not involving hydraulics, and of very different form from the trailer of the present invention.

The patent of McGaughan (U.S. Pat. No. 1,989,940) discloses a portable service station having a removable truck dolly. Page 2, Col 1, lines 14-22; FIG. 4. No hydraulic system is described, but the patent states that the truck dolly can be removed if the station is raised by suitable jacks. p. 2, Col 1, lines 10-12.

The patent of Wallace (U.S. Pat. No. 2,576,907) discloses a hydraulic apparatus, of quite different form from the present invention, employing hydraulic cylinders for lifting vehicles from below, which apparatus is movably mounted in tracks in a floor. Col 2, line 20—Col 3, line 57; FIG. 1.

The patent of Donaldson (U.S. Pat. No. 2,294,110) discloses a boatwheel chassy in which the wheel can be swung up to facilitate disconnecting it from the boat, and is not believed to be directly relevant to applicant's invention.

Where a trailer with a removable truck dolly is used to transport very heavy equipment, as in oil industry applications described above, the truck dolly itself is quite heavy, often weighing of the order of 4,500 pounds. Thus, in trailers of the form shown in Couse or Hulse several men may be required to remove or reattach the truck dolly. Also, when the dolly is completely removed to lower the trailer to ground level, and the equipment is to be used at a remote location for an extended period of time, there is the problem that the truck dolly could be stolen.

Applicant is not aware of any hydraulically operated trailer having a beneficial feature of applicant's invention, namely a truck dolly which is moved in or out from under the trailer by the hydraulic system when the trailer is to be raised or lowered, without manual labor, which dolly pivots upward in an arc about a junction at the rear of the trailer, remaining attached when the trailer is operated at ground level.

Applicant is aware of a hydraulic jack assembly, (hereinafter "Gallagher assembly") not described in any patent known to applicant, which has, according to applicant's present information, been in public use in the United States for several years, which is in one respect similar to the individual hydraulic jack assemblies used in the preferred embodiment of applicant's invention. In the Gallagher assembly, as in applicant's assembly, telescoping square tubes are used in conjunction with a hydraulic cylinder. In the Gallagher assembly, the hydraulic cylinder is inside the telescoping square tubes, whereas in applicant's trailer platform the hydraulic cylinder and the telescoping square tubes are parallel, with neither inside the other.

The patents referred to above are all of the patents which applicant learned of from a search carried out at the Patent and Trademark Office, which search was ordered with reference to the present invention.

SUMMARY OF THE INVENTION

The present invention is a hydraulically operated trailer suited for transporting heavy equipment to a remote location, and lowering the trailer platform with the equipment to ground level for operation.

A plurality of hydraulic jack assemblies located near the front and rear of the trailer platform contain jacks which are used to raise or lower the trailer platform for conversion between the operating configuration and the transport configuration.

In the transport configuration the trailer platform is supported at the rear by a truck dolly, and is secured at the front to a truck tractor. The truck dolly is pivotally secured to a cylindrical shaft which slides upon track wheels within tracks in a guideway at the rear of the trailer platform, and is moved within the guideway by a push-pull hydraulic ram which is attached to the shaft and to the trailer platform.

When the operating site is reached and the trailer platform is to be lowered to ground level, the forward jacks are lowered to bear the weight of the forward end of the trailer platform, and the trailer platform is disconnected from the truck tractor. The front jack is then retracted lowering the front end of the trailer platform, to a position at or near ground level. The rear jacks are then lowered to the ground and used to raise the rear of the trailer platform slightly, to remove the weight of the trailer platform from the truck dolly. The push-pull hydraulic ram is then activated, and pushes the truck dolly out along the tracks to the edge of the trailer platform. The rear jacks are then retracted, thus lowering the rear portion of the trailer platform. As the rear of the trailer platform approaches the ground, the torque exerted about the shaft by the weight of the trailer platform and equipment causes the truck dolly to pivot upward in an arc about the shaft as an axis, the truck dolly remaining secured to the shaft and thus to the trailer platform when the trailer platform is at ground level.

Each hydraulic jack assembly consists of a hydraulic cylinder and jack, parallel to a pair of telescoping square tubes, which arrangement enhances stability of the trailer platform during raising and lowering operations.

One purpose of the invention is to provide a trailer platform suitable to transport heavy equipment to remote operating sites, and there to lower the same to ground level for operation.

Another purpose of the invention is to provide a trailer platform which affords ample over-the-road clearance, for transport over rough, uneven terrain.

Another purpose of the invention is to provide a trailer platform having a truck dolly which may be automatically moved from under the trailer platform, without manual labor, when the trailer platform is to be lowered to the ground.

Another purpose of the invention is to provide a trailer platform having a truck dolly which remains secured to the trailer platform when the trailer platform is lowered to the ground, to prevent theft of the truck dolly when the trailer platform remains at a remote location for an extended period.

Another purpose of the invention is to provide a trailer platform with hydraulic means for raising or lowering the trailer platform, having great mechanical stability during raising and lowering operations.

DESCRIPTION OF THE PREFERRED EMBODIMENTS

Figure 1:
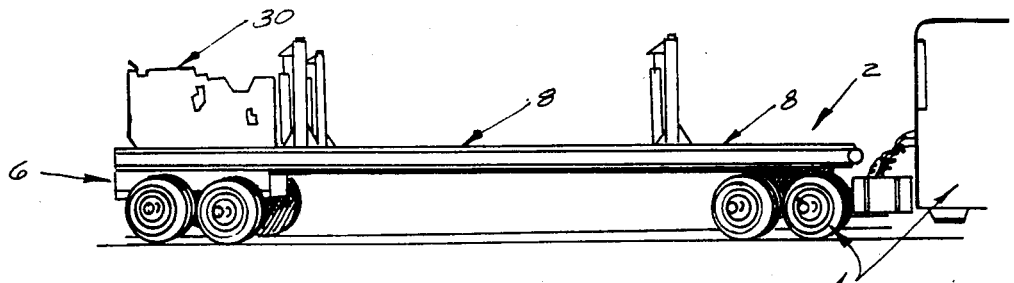
FIG. 1 is a side elevational view of the trailer in the configuration for transport.

Turning now to the drawings, wherein like reference numbers denote like or corresponding parts, the trailer platform 2 is shown in FIG. 1 in the transport position, wherein it is supported at the front by a truck tractor 4 and at the rear by a truck dolly 6. The trailer platform 2 is secured to the truck tractor 4 by a fifth wheel pin (not shown) in a manner well known in the art. The open portion 8 of the upper surface of the trailer platform 2 is available for transporting equipment to an operational site.

In the rear section of the trailer platform 2 is a rectangular opening forming a guideway 10, which guideway 10 is parallel to the longitudinal axis of the trailer platform 2 and is open to the bottom and to the rear of the trailer platform 2, and which is bounded along its longitudinal edges by tracks 12, for guidance of the motion of the truck dolly 6, as further described below.

Mounted upon the top of the trailer platform 2 are a plurality of hydraulic jack assemblies 14 used in raising and lowering the trailer platform 2 as described below. In the preferred embodiment there are three hydraulic jack assemblies 14, one on the front portion and two on the rear portion of the trailer platform 2.

Each hydraulic jack assembly 14 comprises a hydraulic cylinder 16 and coaxial jack 18 mounted parallel to two coaxial telescoping square tubes 20, of slightly different diameters. The upper end of the hydraulic cylinder 16 is attached to the upper end of the larger telescoping square tube 22, and the lower end of the jack 18 is attached to the lower portion of the smaller telescoping square tube 24, so that the smaller telescoping square tube 24 is moved in or out of the larger telescoping square tube 22, by motion of the jack 18. The smaller telescoping square tube 24 has a foot 26 of larger diameter at the base thereof, for engaging the ground surface and bearing the weight of the trailer platform 2 and its load of equipment. There are, of course, suitable holes (not shown) in the trailer platform 2, at the positions of the jacks 18 and telescoping square tubes 20, to allow these parts to pass through the trailer platform 2. Triangular fins 28 attached to the lower ends of the larger telescoping square tube 22 and to the upper surface of the trailer platform 2 are found to enhance stability of the trailer platform 2 during raising and lowering operations.

As further discussed below, each of the hydraulic cylinders 16 is connected by suitable tubing and valves to a source 30 of pressurized hydraulic fluid (see the discussion of FIG. 10, below).

The hydraulic jack assemblies 14, the pressurized hydraulic fluid source 30, and the tubing and valves connecting the same, together constitute a hydraulic lift means for raising and lowering the trailer platform 2.

Figure 8:
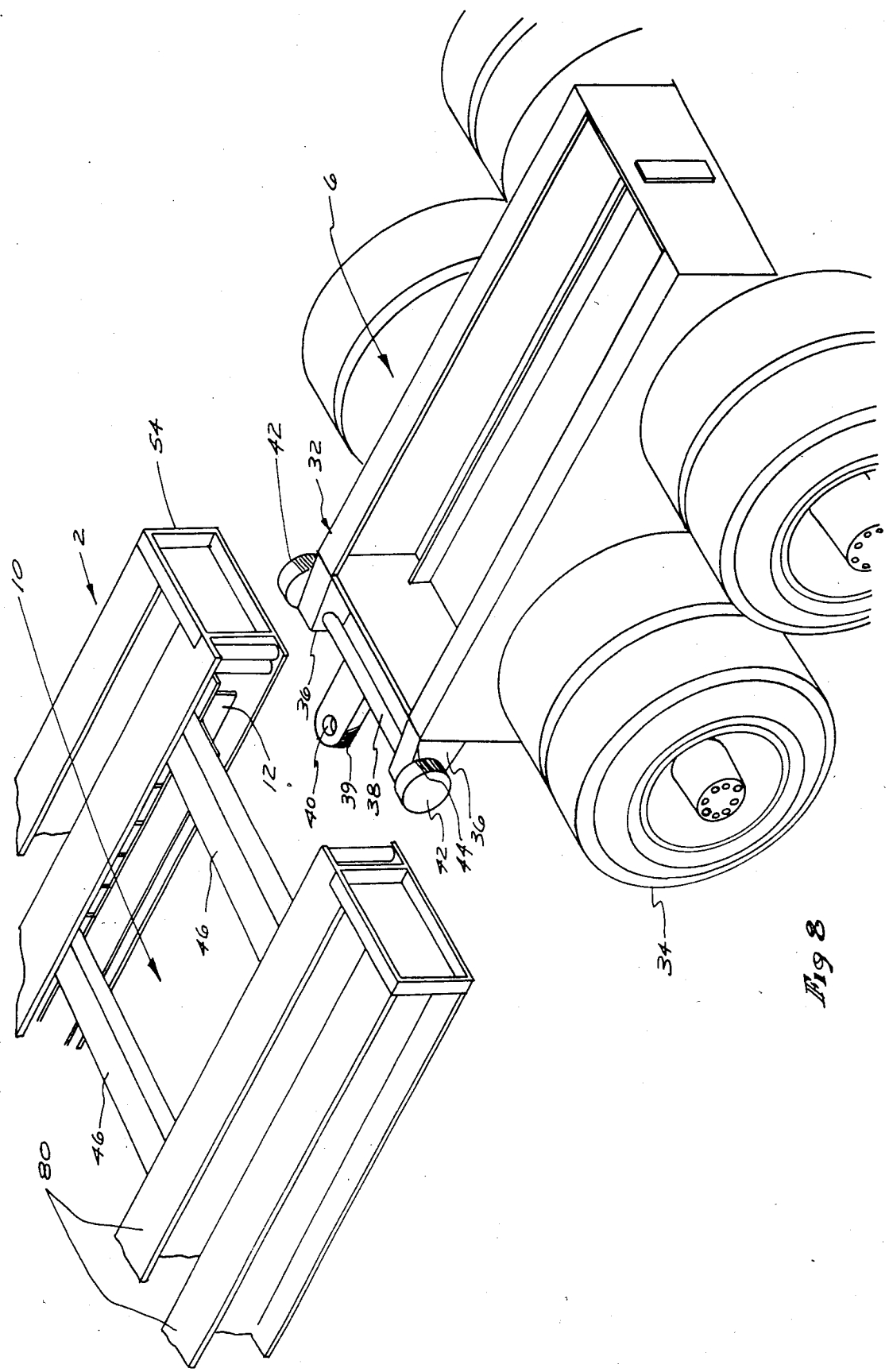
FIG. 8 is a perspective view of the rear portion of the trailer platform and of the truck dolly, from the rear direction, showing the truck dolly removed from the trailer platform, a configuration which would not occur during actual use, which is shown for illustrative purposes only.
Figure 9:
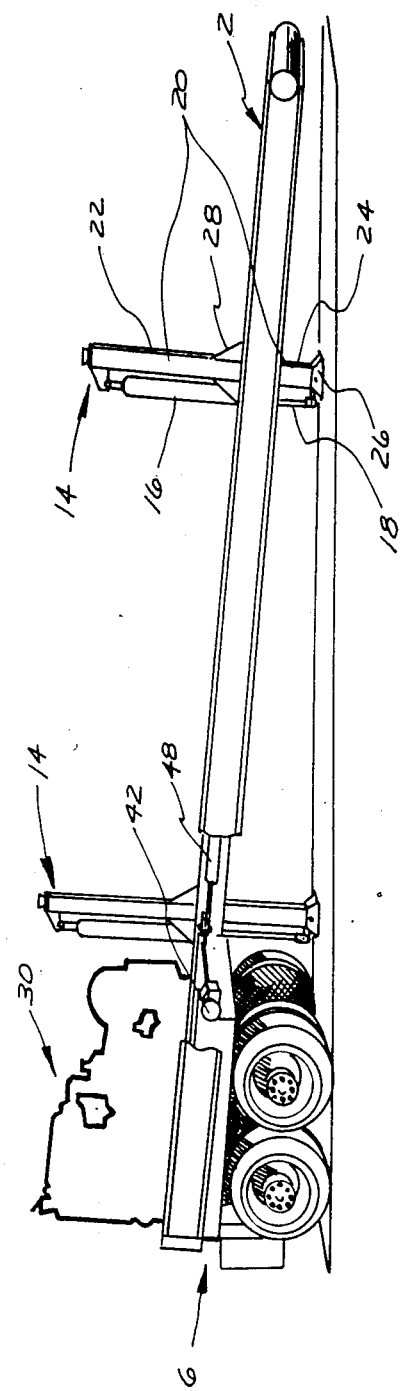
FIG. 9 is a perspective view of the trailer platform in the orientation of FIG. 3, with a portion of the structure cut away to reveal the push-pull hydraulic ram and the truck dolly.

As best shown in FIG. 8, the truck dolly 6 comprises a hollow box 32, supported by truck tires 34, tire axles, and suspension hangers (not shown). Attached to the forward end of the box 32 are two generally rectangular supports 36 having horizontal transverse holes through which is mounted a horizontal cylindrical shaft 38. To the middle of the shaft 38 is attached a tongue 39 having a hole 40. Two track wheels 42 are rotatably secured to the two ends of the shaft 38, by bearings or other suitable means well known in the art. The track wheels 42 guide the motion of the truck dolly 6 within the guideway 10, by rolling or sliding within the tracks 12. Each of the supports 36 has an appropriate cant 44 on the upper end thereof, which is useful when the system configuration is near the configuration shown in FIG. 4, in which the front end of the trailer has been lowered but the rear end has not yet been lowered (see discussion of lowering operation below). In this configuration the cant 44 allows a better match where the supports 36 contact the L-shaped member shown in FIG. 8, in view of the slanted orientation of the trailer when the forward portion is lowered to the ground before the rear portion is lowered. The angle of the cant 44 is also chosen to be sufficient for operation in the expected type of non-level terrain, so that where the truck dolly 6 is standing below the level of the trailer platform 2, the supports 36 being thus inclined at an angle to the horizontal, the supports 36 will not collide with the cross members 46 when the truck dolly 6 is moved with respect to the trailer platform 2. The angle A of the cant (with respect to the horizontal direction) is readily seen to be the sum of two angles $A_1$ and $A_2$ determined as follows. $A_1$ is the angle (to the horizontal) of the maximum slant of the trailer platform 2, when the forward end of the trailer platform 2 has been lowered to ground level, and the rear end of the trailer platform 2 is at its maximum height H prior to lowering the rear portion of the trailer platform 2. That is, $$A_1 = \sin^{-1}(H/L),$$

where L is the length of the trailer platform 2. The angle $A_2$ is the maximum inclination of the supports 36 in a direction above the horizontal direction, when the rear wheels of the truck dolly 6 are at a level D below the forward wheels of the truck dolly, corresponding to the maximum expected depth D of irregularities in the terrain over which the hydraulic trailer is to be used. That is, $$A_2 = \sin^{-1}(D/S_W),$$

where $S_W$ is the wheel spacing of the truck dolly wheels. The A angle of the cant 44 of the supports 36 is then $$A = A_1 + A_2.$$

Those familiar with the art will understand that, depending upon the intended applications and loads to be carried by the hydraulic trailer, the trailer platform 2 may be made of sufficient thickness so that the cross members 46 may be placed at a sufficient height above the tracks 12, such that it is not necessary to have the above-described cant 44 on the upper end of each of the supports 36. The present invention is accordingly not to be understood as being limited to configurations involving the cant 44.

The track wheels 42 slide or roll within the tracks 12 at the edges of the guideway 10, the truck dolly 6 being secured to the trailer platform 2 by a push-pull hydraulic ram 48 having at one end thereof a clevis 50 secured to the truck dolly 6 by a bolt 52 passed through the hole 40 in the tongue 39 attached to the shaft 38. The other end of the push-pull hydraulic ram 48 is attached to the trailer platform 2.

As further described below, the push-pull hydraulic ram 48 is connected by suitable tubing and valves to the source 30 of pressurized hydraulic fluid. The push-pull hydraulic ram 48 is the conventional type well known in the art, in which the ram may be moved in either direction by the application of hydraulic pressure to either side of a piston.

The total range of motion of the push-pull hydraulic ram 48 is such that when the ram 48 is fully extended the box 32 of the truck dolly 6 is outside the track 12 and just beyond the rear end 54 of the trailer platform 2, while the shaft 38 and track wheels 42 remain within the track 12, just forward of the rear end 54 of the trailer platform 2.

Figure 10:
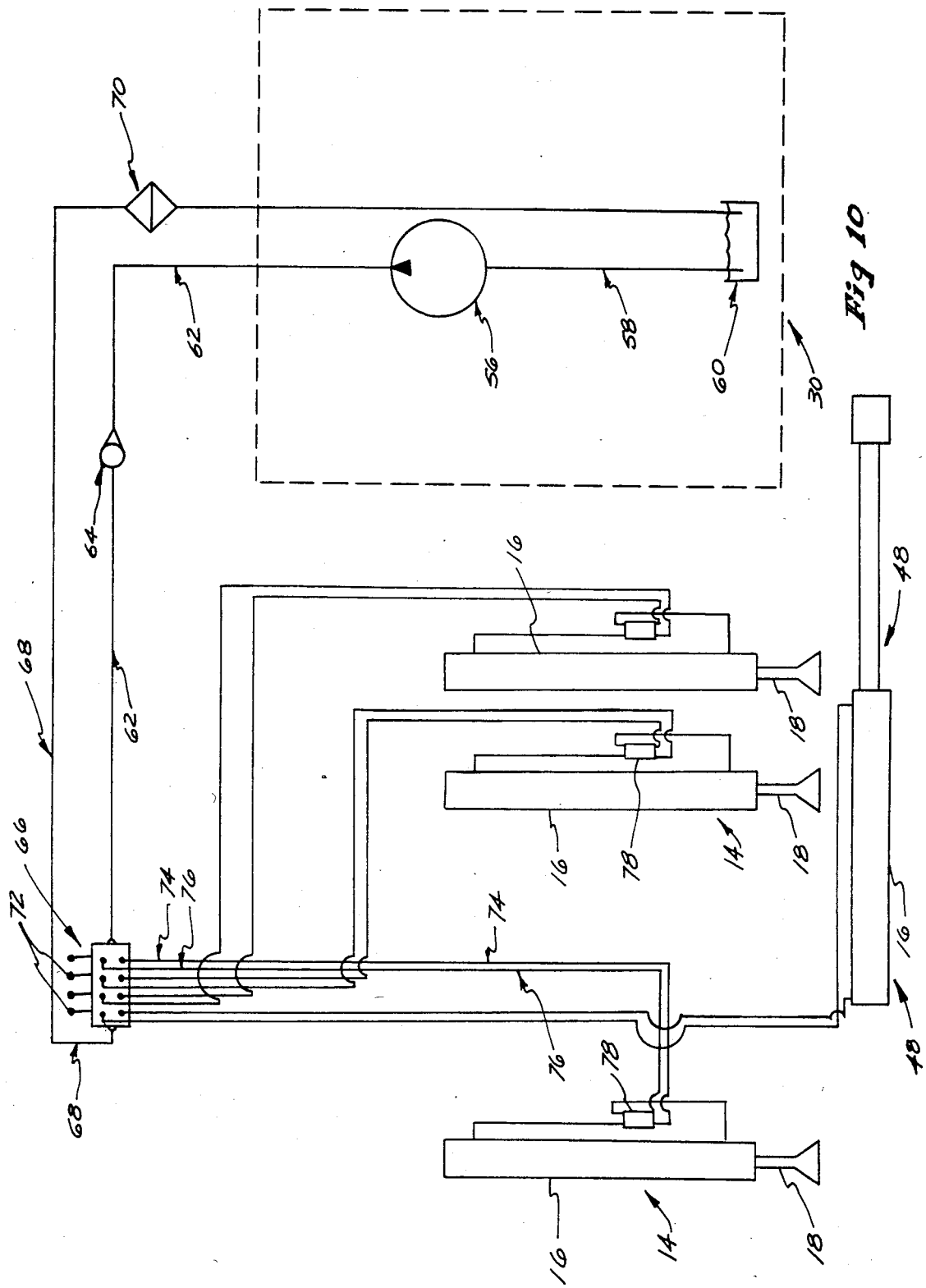
FIG. 10 is a schematic drawing of the hydraulic circuit of the present invention.

As indicated in FIG. 10, the source 30 of pressurized hydraulic fluid comprises a hydraulic pump 56 connected by a line of hydraulic tubing 58 to a hydraulic fluid reservoir 60. The hydraulic pump 56 conveys pressurized hydraulic fluid through a line 62, having a conventional check valve 64, to a 4-lever control valve 66. In the preferred embodiment pump 56 is a Vickers brand model V10-1-3-P-7-K-1, rated at 2200 RPM and 2000 PSI. The check valve 64 is a standard one-way hydraulic valve, which prevents hydraulic fluid from draining back to the hydraulic fluid reservoir 60 when the hydraulic pump 56 is off, for those applications in which the hydraulic fluid reservoir 60 is situated below a portion of the line 62. The 4-lever control valve 66 is a conventional valve by means of which any of the four pairs of lines shown descending from the valve 66 may be internally connected to the line 62 and to a return line 68 which conveys hydraulic fluid back to the hydraulic fluid reservoir 60 through an oil filter 70; one line of the pair being connected to line 62 while the other one of the pair is connected to the return line 68. Each lever 72 also has a neutral position in which neither line of the pair is connected to either line 62 or return line 68. Thus, for example, the rightmost of the levers 72 may be turned to a position in which line 62 is internally connected to line 74 while line 76 is simultaneously connected internally to return line 68; or to a position in which line 62 is connected to line 76 and line 74 is connected to return line 68; or to the neutral position in which none of the above-cited connections exist. In the preferred embodiment applicant has used for the 4-lever control valve 66 a valve of Vickers manufacture, the inlet section being part No. ML 25P-U-B, the middle section (with the levers 72) being four of part No. ML25W-12-M-V-C-A-S, and the return section being part No. ML25E-5. The 4-lever control valve 66 is rated at 25 GPM, and 3000 PSI.

In the preferred embodiment each of the hydraulic jack assemblies 14 uses the same type of hydraulic cylinder 16 as that used in the push-pull hydraulic ram 48. This is a conventional type of hydraulic cylinder in which a line carrying hydraulic fluid is connected at each end of the cylinder 16, one conveying pressurized fluid into the cylinder 16 and the other conveying fluid back toward the hydraulic fluid reservoir 60. A piston within the cylinder 16 is moved in the direction of the incoming pressurized hydraulic fluid, and the pressure exerted upon the piston by the incoming fluid pushes the fluid on the other side of the piston back toward the hydraulic fluid reservoir 60. The direction of motion of each of the jacks 18 of the hydraulic jack assemblies 14, and of the push-pull hydraulic ram 48, may be reversed by changing the position of the corresponding lever 72 of the 4-lever control valve 66, so as to reverse the connections with the lines 62 and 68, as described above. The lines connected to the hydraulic cylinder 16 of each of the hydraulic jack assemblies 14 have, as a safety measure, conventional lock valves 78. These valves, which are well known in the art, contain sensors which sense any sudden and significant loss of hydraulic pressure, and a mechanism which automatically closes the valve upon such loss of pressure. The lock valves 78 act to prevent unintentional lowering of the trailer platform 2 in the event of a leak in either of the lines connecting the lock valves 78 to the source 30 of pressurized hydraulic fluid. The lock valve 78 accomplishes this result by automatically closing both of the lines connected to the ends of the hydraulic cylinder 16, in the event that the lock valve 78 senses a loss of hydraulic pressure. Of course the lock valve 78 is not effective in the event of a leak in one of the lines at a point between the lock valve 78 and either end of the hydraulic cylinder 16. The lock valves are Racine brand, part No. 25720-4, in the preferred embodiment.

Figure 2:
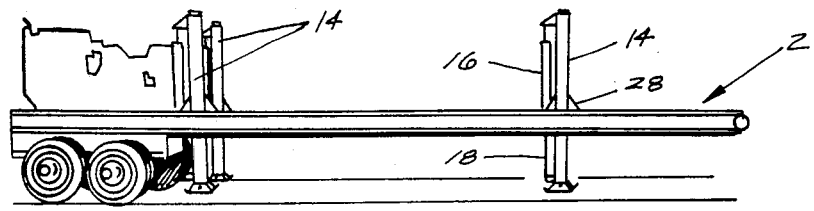
FIG. 2 is a side elevational view of the trailer in the configuration immediately before commencement of the lowering operation, with the truck tractor removed, and the front portion of the trailer platform supported by the forward hydraulic jack assembly.
Figure 3:
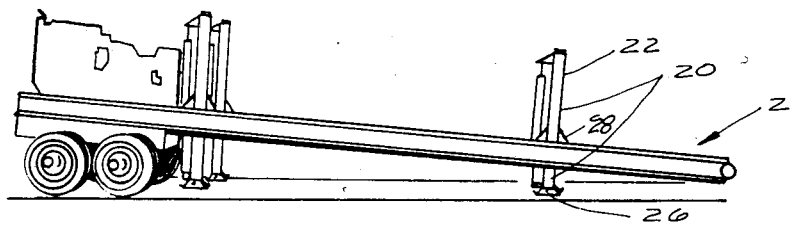
FIG. 3 is a side elevational view of the trailer during the first phase of the lowering operation, showing the forward end of the trailer platform lowered to near ground level by the forward hydraulic jack assembly.

The sequence of the normal lowering operation, for converting the trailer platform 2 from the transport position to the operational (ground level) position is illustrated in FIGS. 1-6, for level terrain. The jack 18 of the forward hydraulic jack assembly 14 is extended to support the weight of the forward portion of the trailer platform 2, and the truck tractor 4 is disconnected and removed, as shown in FIG. 2. The forward jack 18 is then retracted into the hydraulic cylinder 16 until the forward end of the trailer platform 2 is near ground level, as shown in FIG. 3.

Next, the jacks 18 of the two hydraulic jack assemblies 14 located in the rear portion of the trailer platform 2 are extended to ground level, and are further extended sufficiently to lift the rear portion of the trailer platform 2 slightly, so that the truck dolly 6 is no longer restrained by the weight of the trailer platform 2, and may be moved longitudinally relative to the trailer platform 2. This configuration is illustrated in FIG. 3.

Figure 4:
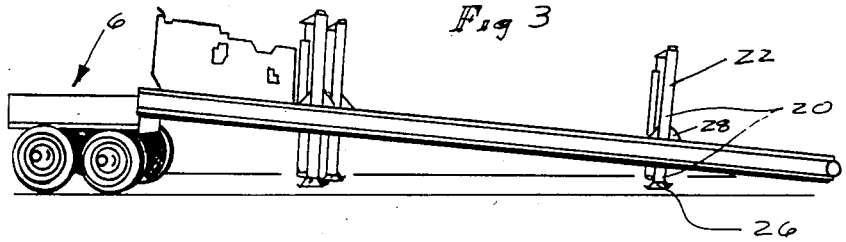
FIG. 4 is a side elevational view of the trailer in the next phase of the lowering operation, showing the truck dolly moved out to the rear edge of the trailer platform by the push-pull hydraulic ram.

Next, the push-pull hydraulic ram 48 is activated through application of pressurized hydraulic fluid from the pressurized hydraulic fluid source 30, and is used to push the truck dolly 6 to the rear, the track wheels 42 guiding the shaft 38 within the tracks 12, until the box 32 and the shaft 38 of the truck dolly 6 clears the rearmost cross member 46 with the shaft 38 remaining within the tracks 12. This configuration is illustrated in FIG. 4.

Figure 5:
FIG. 5 is a side elevational view of the trailer during the final phase of the lowering operation, showing the rear end of the trailer platform being lowered toward the ground by the rear hydraulic jack assemblies, and showing the truck dolly pivoting upward about the shaft as an axis.
Figure 6:
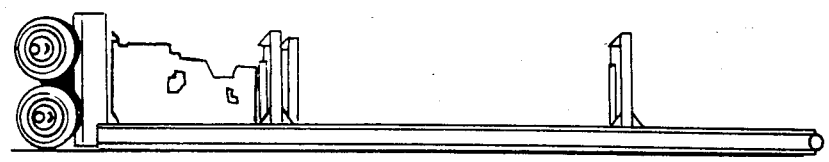
FIG. 6 is a side elevational view of the trailer in the fully lowered position, at ground level (as used at a level operational site).
Figure 7:
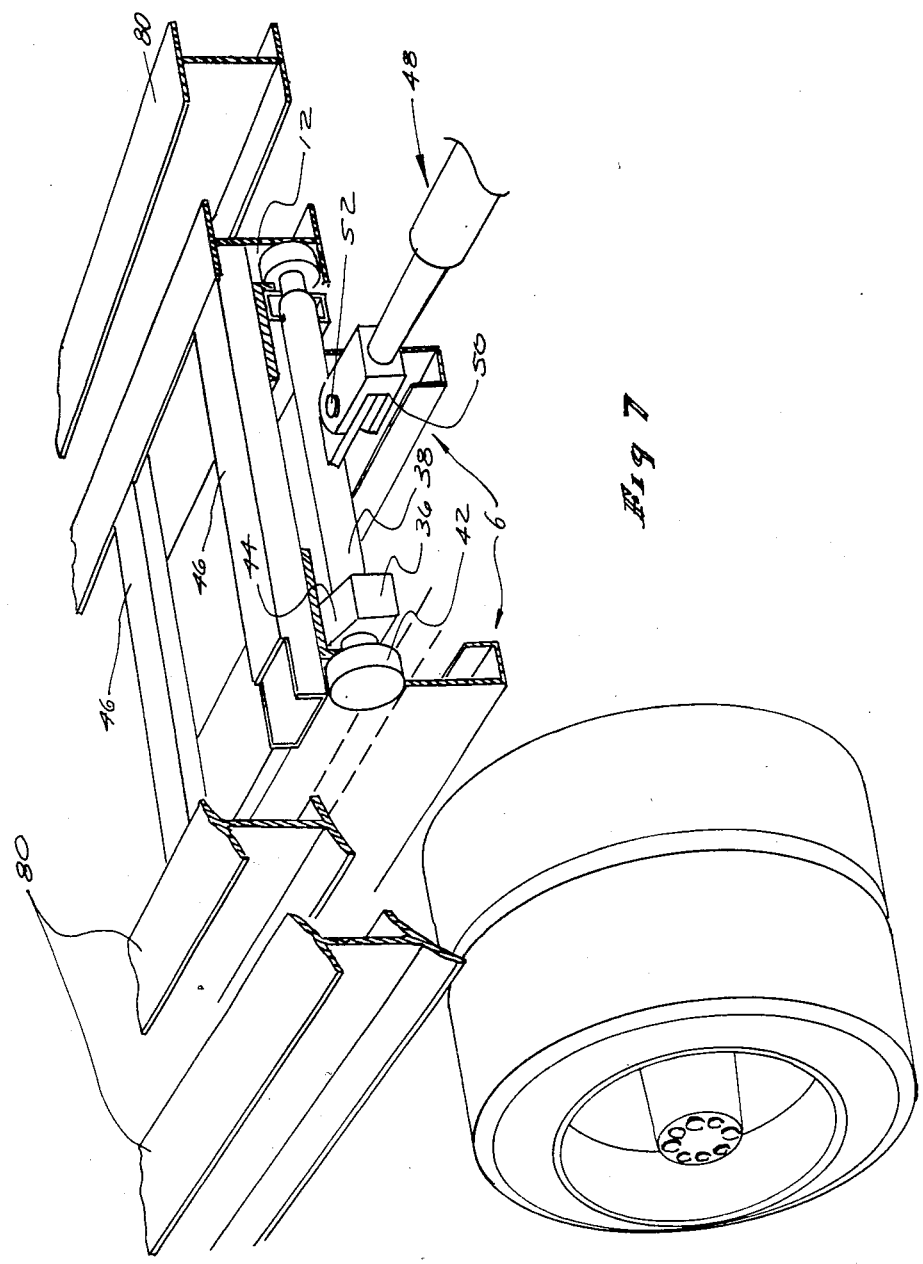
FIG. 7 is a perspective view of the rear portion of the trailer platform, from the forward direction, with a portion of the structure cut away to reveal the juncture of the push-pull hydraulic ram and the shaft securing the truck dolly, and the tracks within which the shaft slides.

Then, the jacks 18 of each of the rear hydraulic jack assemblies 14 are retracted, allowing the rear portion of the traler platform 2 to descend toward the ground. As the rear portion of the trailer platform 2 approaches ground level, the torque exerted about the shaft 38 by the weight of the trailer platform 2 causes the truck dolly 6 to pivot upward in an arc about the shaft 38 as an axis, with the truck dolly 6 remaining secured to the shaft 38 and thus secured to the trailer platform 2. This configuration is shown in FIG. 5. The jack 18 of the forward hydraulic jack assembly 14 is also further retracted as the rear portion of the trailer platform 2 approaches ground level. When all 3 jacks 18 are sufficiently retracted, the trailer platform 2 reaches ground level, as illustrated in FIG. 6.

The trailer platform 2 may also be lowered in a slightly different manner, in which the forward end of the trailer is lowered completely to ground level through sufficient retraction of the jack 18 of the forward hydraulic jack assembly 14, before any lowering of the rear portion of the trailer platform 2.

There may also be applications in which the trailer platform 2 should be maintained in a level configuration while being lowered. This mode of operation can be attained by uniformly retracting the jacks 18 of the hydraulic jack assemblies 14, after the trailer platform 2 is ready for lowering.

The trailer platform 2 may also be put in operational configuration on very non-level terrain. Since each of the hydraulic jack assemblies 14 may be operated independently, each of the jacks 18 may be so positioned that the trailer platform 2 assumes a stable, horizontal configuration at a desired height, even where the terrain is too uneven to allow the trailer platform 2 to be lowered completely to ground level.

The present invention has been manufactured in the following manner, in applicant's preferred embodiment: The basic frame is composed of two or four I beams 80 (depending upon the size of the trailer platform 2) from 10 to 50 feet in length. The I beams 80 are connected by a series of cross members 46. These cross members may be formed from C-channel I beam or pipe. At the rear of the trailer, in the case of a four-beam trailer, the two inside I beams 80 are fabricated to be part of a track assembly, forming the tracks 12 for the track wheels 42 which guide the longitudinal motion of the truck dolly 6. The top of the track assembly is formed by the equally-spaced cross members 46 which are connected at the top of each I beam 80. The bottom portion of each track 12 is formed by the bottom flange of each I beam 80. The hydraulic push-pull ram 48 is connected to the trailer platform 2 forward of the tracks 12 by means of a pin and clevis (not shown), and the ram of the push-pull hydraulic ram is connected to the truck dolly 6 in the manner already described. All parts of the trailer are of common manufacture or are fabricated of beam, plate, C-beams, I beams, or pipe by common welding methods, or are formed from machined castings, in a manner well known in the art.

Although in the preferred embodiment the guideway 10 is parallel to the longitudinal axis of the trailer platform 2, those familiar with the art will appreciate that it would be possible to build a trailer platform 2 having a transverse guideway 10, open to the bottom and to one of the sides of the trailer platform 2, instead of being open to the bottom and to the rear edge.

Although a pin and clevis arrangement is used to secure the push-pull hydraulic ram 48 to the trailer 2, and the same type connection secures the truck dolly 6 to the push-pull hydraulic ram 48, those familiar with the art will understand that many other types of connections could instead be used, without departing from the substance of the invention. For example, such connections could be made through use of chain linkages, through use of flexible ball joints, or in countless other ways. The present invention is not to be understood as being limited to the use of any particular form of such connecting linkages. Similarly other details of manufacture of the preferred embodiment are not to be understood as limiting the scope of the invention.

Although steel would be used in fabricating the preferred embodiments of applicant's invention, those familiar with the art will of course understand from the foregoing description that the invention is not dependent upon the use of any particular material, and may be fabricated of other metals or other materials of suitable strength, including high strength plastics.

Those familiar with the art will appreciate that the invention may be fabricated and employed with conveyances and in configurations other than those specifically disclosed herein, and that various changes and modifications other than those indicated above may be made in the invention without departing from the spirit and scope thereof. The essential characteristics of the invention are defined in the following claims:

I claim:

1. Hydraulic trailer for transport of heavy equipment to operational sites, and for lowering said equipment to an operational configuration at or near ground level, comprising:
   (a) a trailer platform, having a guideway which is substantially parallel to the longitudinal axis of said trailer platform and which is open to the bottom of said trailer platform and open to the rear edge of said trailer platform;
   (b) hydraulic lift means, attached to said trailer platform, for raising and lowering said trailer platform, having a source of pressurized hydraulic fluid;
   (c) truck dolly, slidably engaging said guideway of said trailer platform;
   (d) push-pull hydraulic ram, attached to said trailer platform and to said truck dolly, oriented in a direction substantially parallel to said guideway of said trailer platform;
   (e) tubing and valve means, communicating with said source of pressurized hydraulic fluid of said hydraulic lift means, and with said push-pull hydraulic ram, for conveying pressurized hydraulic fluid from said source of pressurized hydraulic fluid to said push-pull hydraulic ram
   (f) pivoting means, connected to said truck dolly and to said trailer platform, operative when said truck dolly engages the essentially rearmost portion of said guideway with said push-pull hydraulic ram being essentially fully extended, for allowing said truck dolly to pivot upward in an arc while remaining connected to said trailer platform, as the rear end of said trailer platform is lowered to ground level by said hydraulic lift means.

2. The hydraulic trailer of claim 1, wherein said hydraulic lift means further comprises a plurality of hydraulic jack assemblies attached to said trailer platform; and tubing and valve means, connecting said source of pressurized hydraulic fluid and with each of said hydraulic jack assemblies, for conveying pressurized hydraulic fluid from said source of pressurized hydraulic fluid to each of said hydraulic jack assemblies.

3. The hydraulic trailer of claim 2, wherein each of said hydraulic jack assemblies is attached to the upper surface of said trailer platform, and wherein each of said hydraulic jack assemblies further comprises:
   (a) a hydraulic cylinder connected to said tubing and valve means of said hydraulic lift means;
   (b) a hydraulic jack connected to, coaxial with, and driven by said hydraulic cylinder;
   (c) two coaxial telescoping square tubes of slightly different diameters, parallel to said hydraulic cylinder, the square tube of larger diameter being attached near the top of said square tube to the top of said hydraulic cylinder, and the square tube of smaller diameter being attached near the bottom of said square tube to the bottom end of said hydraulic jack;
   (d) a plurality of triangular fins attached to each of the outer telescoping square tubes at the bottom thereof and attached to the upper surface of said trailer platform, with the two short sides of the triangle being so attached.

4. The hydraulic trailer of claim 2, wherein said source of pressurized hydraulic fluid comprises a hydraulic pump connected by tubing to a reservoir of hydraulic fluid.

5. The hydraulic trailer of claim 1, wherein said truck dolly futher comprises:
   (a) a hollow box;
   (b) a plurality of wheel axles, attached to said box;
   (c) a plurality of truck tires mounted upon each of said wheel axles;
   (d) suspension hangers attached to said box and to said wheel axles;
   (e) two supports, attached to the forward end of said box, each having a horizontal transverse hole;
   (f) a horizontal cylindrical shaft passing through said holes in said supports and securely attached to said supports;

(g) two track wheels, rotatably attached to the ends of said horizontal cylindrical shaft;

(h) a tongue, attached to the middle portion of said cylindrical shaft, having a hole in said tongue.

6. The hydraulic trailer of claim 5, further comprising a clevis attached to one end of said push-pull hydraulic ram, and a bolt securing said clevis to said hole in said tongue of said cylindrical shaft.

7. The hydraulic trailer of claim 5, wherein each of said supports has a cant on the forward upper surface thereof, with an angle A to the horizontal, said angle being $A = A_1 + A_2$, where $$A_1 = \mathrm{Sin}^{-1}(H/L),$$

where H is the maximum height above ground of the rear end of said trailer platform and L is the length of said trailer platform, and $$A_2 = \mathrm{Sin}^{-1}(D/S_W),$$

where D is the maximum expected depth of irregularities in the terrain over which the hydraulic trailer is to be used, and $S_W$ is the wheel spacing of the truck dolly wheels.

* * * * *